United States Patent
Chida et al.

(10) Patent No.: US 10,381,148 B2
(45) Date of Patent: Aug. 13, 2019

(54) TRANSFORMER AND POWER CONVERTER USING THE SAME

(71) Applicant: Hitachi Automotive Systems, Ltd., Hitachinaka-shi, Ibaraki (JP)

(72) Inventors: Tadahiko Chida, Tokyo (JP); Mikito Komatsu, Hitachinaka (JP); Kenji Kubo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 28 days.

(21) Appl. No.: 15/122,294

(22) PCT Filed: Jan. 14, 2015

(86) PCT No.: PCT/JP2015/050707
§ 371 (c)(1),
(2) Date: Aug. 29, 2016

(87) PCT Pub. No.: WO2015/136957
PCT Pub. Date: Sep. 17, 2015

(65) Prior Publication Data
US 2016/0372250 A1   Dec. 22, 2016

(30) Foreign Application Priority Data
Mar. 12, 2014   (JP) ................... 2014-048315

(51) Int. Cl.
*H01F 17/04*   (2006.01)
*H01F 27/28*   (2006.01)
(Continued)

(52) U.S. Cl.
CPC ............. *H01F 27/22* (2013.01); *H01F 27/02* (2013.01); *H01F 27/2866* (2013.01);
(Continued)

(58) Field of Classification Search
CPC .... H01F 27/2804; H01F 17/0006; H01F 3/10; H01F 2017/0066; H01F 2027/2819
(Continued)

(56) References Cited

U.S. PATENT DOCUMENTS 2,788,486 A * 4/1957 Guggi ................. G01R 31/027
                                                  324/119
3,719,883 A * 3/1973 Pentecost ............ G01R 31/025
                                                  324/538
(Continued)

FOREIGN PATENT DOCUMENTS

EP          0 352 924 A2    1/1990
JP          2-54911 A       2/1990
(Continued)

OTHER PUBLICATIONS

International Search Report (PCT/ISA/210) issued in PCT Application No. PCT/JP2015/050707 dated Apr. 21, 2015 with English-language translation (four (4) pages).
(Continued)

*Primary Examiner* — Alexander Talpalatski
*Assistant Examiner* — Joselito Baisa
(74) *Attorney, Agent, or Firm* — Crowell & Moring LLP

(57) ABSTRACT

To suppress a temperature increase of a transformer. A transformer includes a core, a primary winding, and a secondary winding. The core includes a primary core and a secondary core disposed on a side of the primary core. The primary winding includes a first primary winding wound around the primary core and the second primary winding wound around the secondary core and electrically connected in series to the first primary winding. The first primary winding is disposed such that a direction of a magnetic flux on an inner peripheral side of the first primary winding induced by the first primary winding is opposite to a
(Continued)

direction of the magnetic flux on the inner peripheral side of the second primary winding induced by the second primary winding. The secondary winding is wound such that a winding axial line of the first primary winding and a winding axial line of the second primary winding are formed on an inner peripheral side of the secondary winding.

9 Claims, 9 Drawing Sheets

(51) Int. Cl.
| | | |
|---|---|---|
| *H01F 27/22* | (2006.01) | |
| *H01F 30/10* | (2006.01) | |
| *H02M 3/28* | (2006.01) | |
| *H01F 27/02* | (2006.01) | |
| *H01F 27/29* | (2006.01) | |
| *H01F 27/32* | (2006.01) | |
| *H02M 3/335* | (2006.01) | |
| *H02M 3/337* | (2006.01) | |

(52) U.S. Cl.
CPC ......... *H01F 27/2876* (2013.01); *H01F 27/29* (2013.01); *H01F 27/325* (2013.01); *H01F 30/10* (2013.01); *H02M 3/28* (2013.01); *H02M 3/33576* (2013.01); *H02M 3/337* (2013.01)

(58) Field of Classification Search
USPC .................................................. 336/221, 232
See application file for complete search history.

(56) References Cited

U.S. PATENT DOCUMENTS

| | | | | |
|---|---|---|---|---|
| 4,201,965 A * | 5/1980 | Onyshkevych | ..... | H01F 27/2804 336/180 |
| 4,864,486 A * | 9/1989 | Spreen | ................ | H01F 27/2804 336/175 |
| 4,965,712 A * | 10/1990 | Duspiva | .................. | H01F 30/10 336/175 |
| 5,621,636 A * | 4/1997 | Tanigawa | ................ | H01F 19/04 363/147 |
| 5,926,373 A * | 7/1999 | Stevens | .................... | H02M 3/00 165/80.2 |
| 6,114,932 A * | 9/2000 | Wester | ................ | H01F 17/0006 336/192 |
| 6,281,779 B1 * | 8/2001 | Matsumoto | ............. | H01F 19/04 336/200 |
| 6,535,409 B2 * | 3/2003 | Karol | ..................... | H05K 7/209 361/688 |
| 6,577,220 B2 * | 6/2003 | Liu | ..................... | H01F 27/2847 336/200 |
| 6,713,735 B2 * | 3/2004 | Terano | ................ | B29C 65/3656 156/274.2 |
| 7,176,774 B2 * | 2/2007 | Coleman, Jr. | ........... | H01F 21/12 336/200 |
| 7,187,263 B2 * | 3/2007 | Vinciarelli | .......... | H01F 27/2804 336/200 |
| 7,462,891 B2 * | 12/2008 | Brar | .................. | H01L 21/28575 257/192 |
| 8,054,154 B2 * | 11/2011 | Koprivnak | .......... | H01F 27/2804 333/170 |
| 8,284,010 B2 * | 10/2012 | Tsuji | .................... | H01F 17/0006 336/192 |
| 8,446,244 B1 * | 5/2013 | Kuang | .................... | H01F 27/40 336/220 |
| 8,605,437 B2 * | 12/2013 | Wei | .................... | H05K 7/20781 361/699 |
| 9,460,844 B2 * | 10/2016 | Scholz | ................ | H01F 27/2804 |
| 9,521,781 B2 * | 12/2016 | Frank | ...................... | H01F 27/06 |
| 9,666,363 B2 * | 5/2017 | Kitamura | .............. | H01F 41/063 |
| 9,711,271 B2 * | 7/2017 | Blanke | ................ | H01F 27/2804 |
| 10,147,531 B2 * | 12/2018 | Rai | ......................... | H01F 27/18 |
| 2001/0042905 A1 * | 11/2001 | Katzir | ................ | H01F 27/2804 257/666 |
| 2002/0084027 A1 * | 7/2002 | Terano | ................ | B29C 65/3656 156/272.4 |
| 2005/0110606 A1 | 5/2005 | Vinciarelli | | |
| 2008/0239759 A1 | 10/2008 | Nakahori | | |
| 2009/0147543 A1 | 6/2009 | Sugawara et al. | | |
| 2009/0302694 A1 * | 12/2009 | Asai | ...................... | H02K 3/325 310/45 |
| 2011/0216507 A1 * | 9/2011 | Kadomoto | ............... | H05K 7/20 361/714 |
| 2012/0139684 A1 * | 6/2012 | Kobayashi | ............ | H01F 27/022 336/92 |
| 2012/0206060 A1 * | 8/2012 | Beyer | ................ | H01F 27/2804 315/255 |

FOREIGN PATENT DOCUMENTS

| | | |
|---|---|---|
| JP | 2005-143215 A | 6/2005 |
| JP | 2005-203744 A | 7/2005 |
| JP | 2008-178205 A | 7/2008 |
| JP | 2008-253113 A | 10/2008 |
| JP | 2009-142088 A | 6/2009 |
| JP | 2011-182502 A | 9/2011 |
| JP | 2011-192724 A | 9/2011 |

OTHER PUBLICATIONS

Japanese-language Written Opinion (PCT/ISA/237) issued in PCT Application No. PCT/JP2015/050707 dated Apr. 21, 2015 (four (4) pages).

* cited by examiner

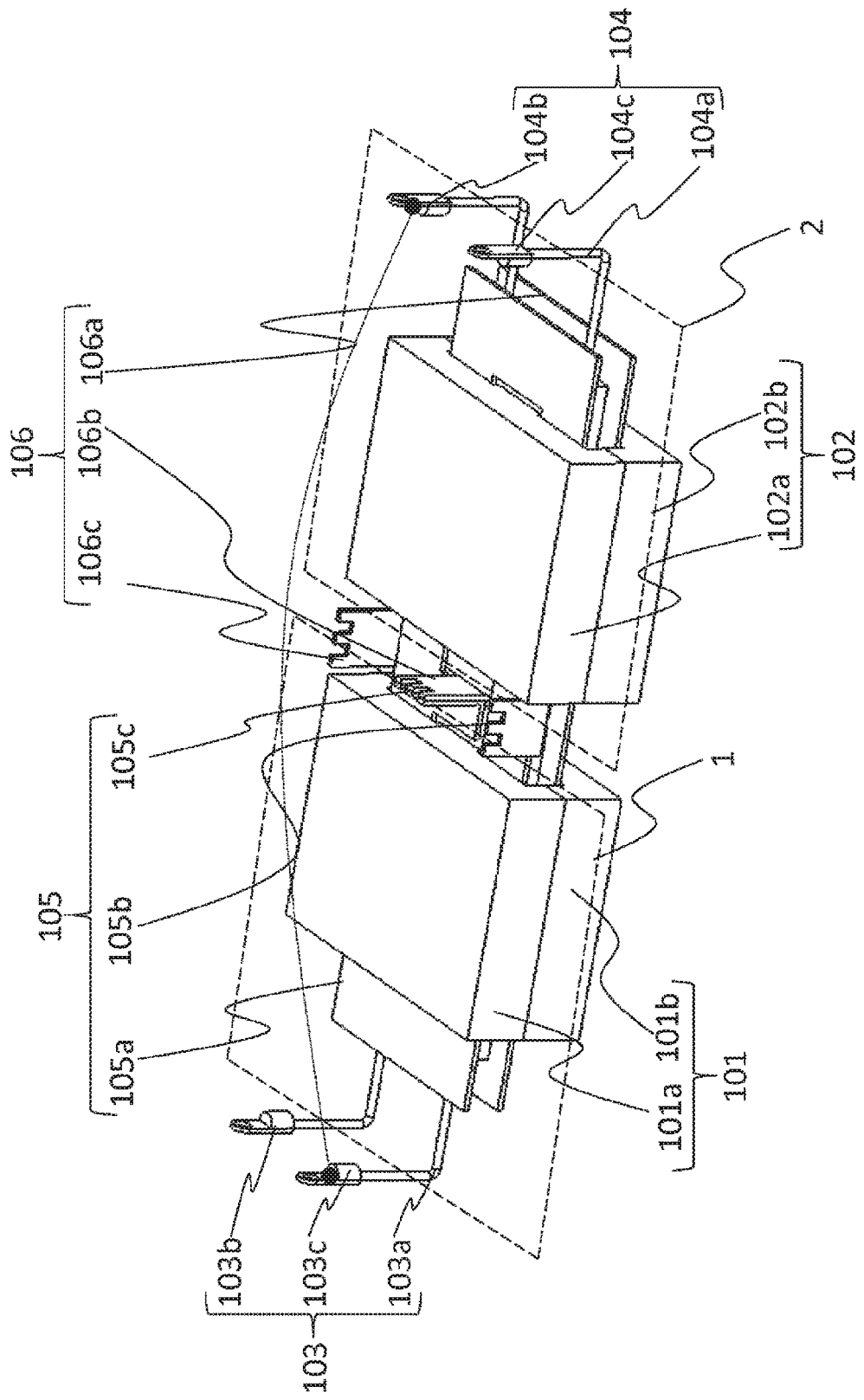

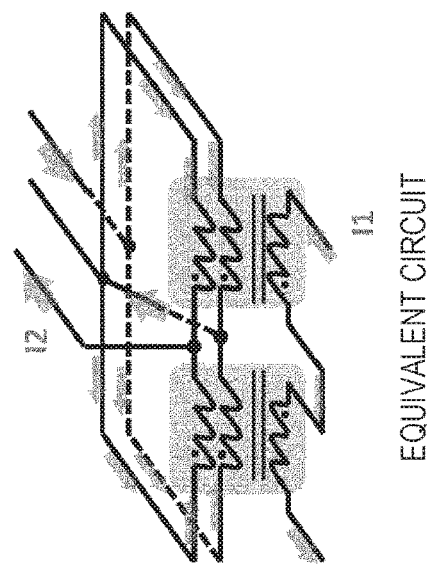
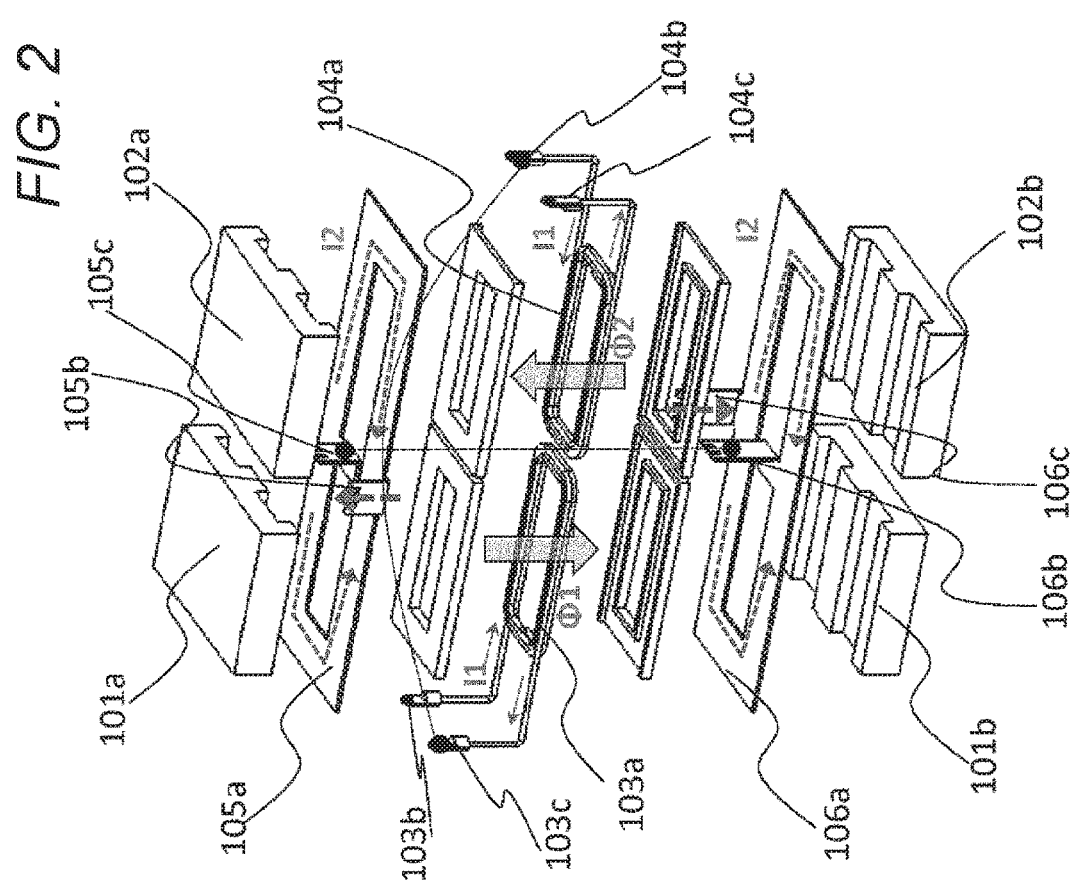
FIG. 2

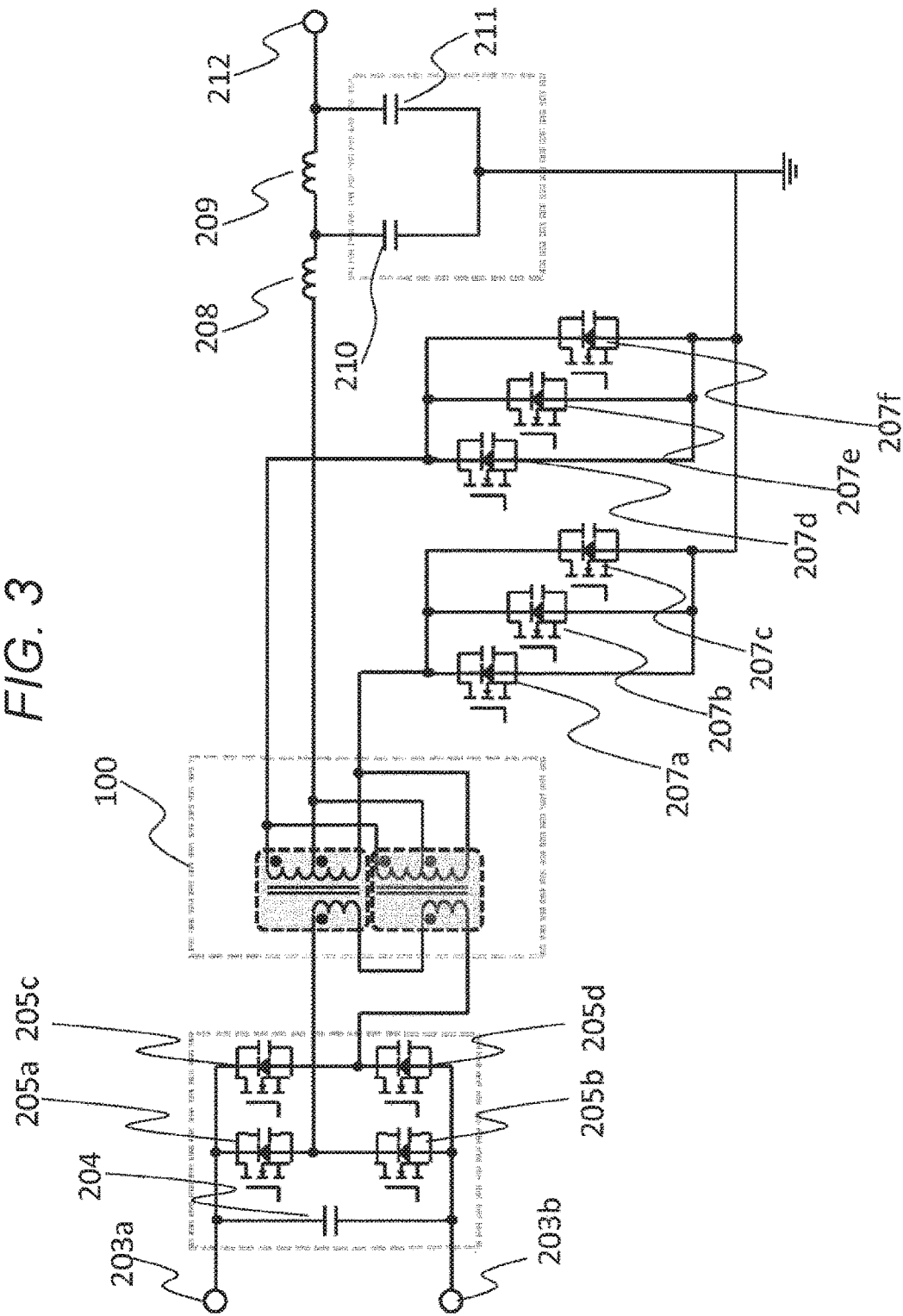

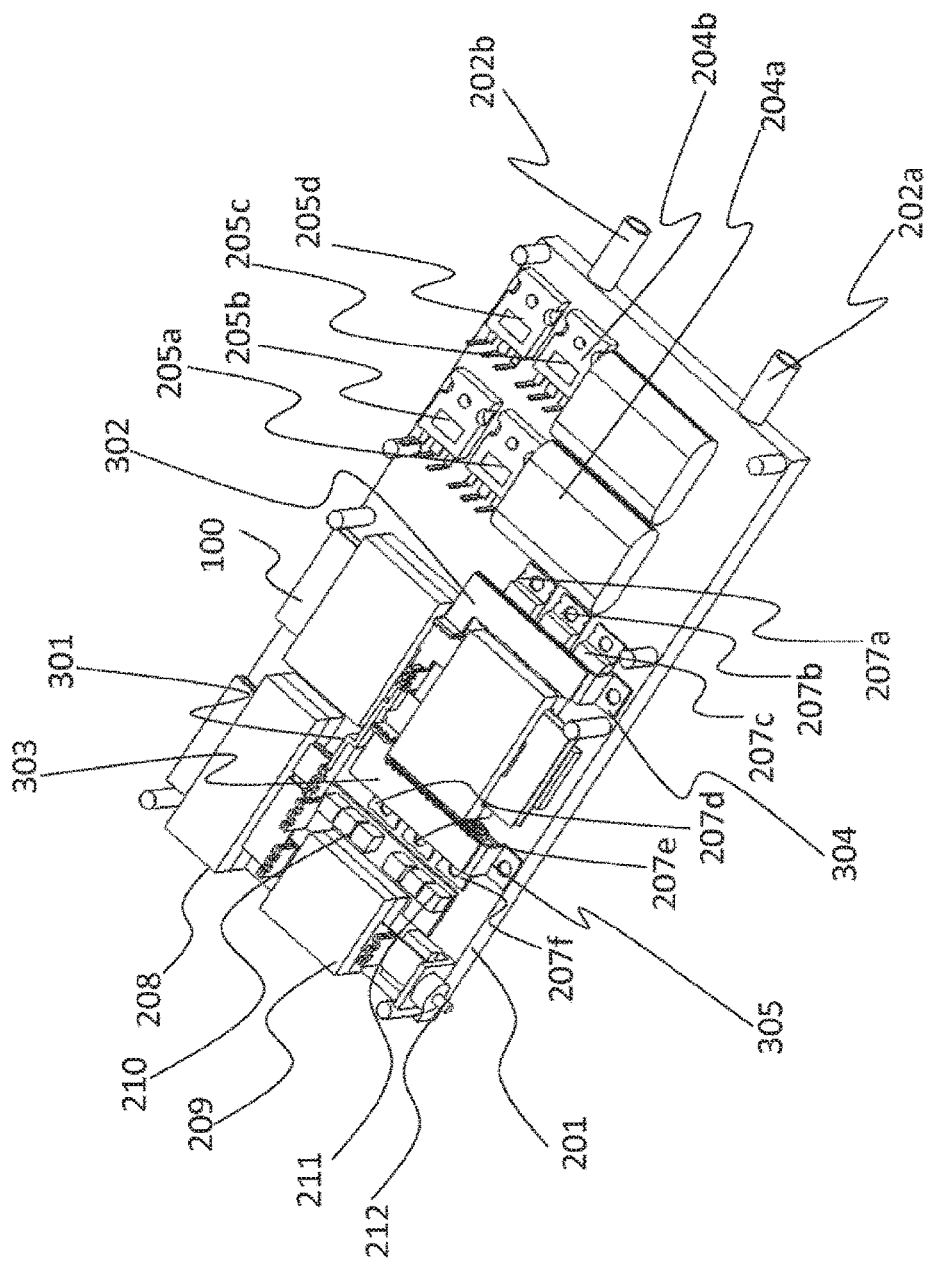

TRANSFORMER AND POWER CONVERTER USING THE SAME

TECHNICAL FIELD

The present invention relates to a transformer and a power converter using the same and especially relates to a transformer and a power converter used in an electric vehicle.

BACKGROUND ART

An electric vehicle and a plug-in hybrid vehicle include an inverter for driving a motor by a high voltage storage battery for driving power and a low voltage storage battery for operating an auxiliary machine such as a light and a radio of the vehicle. A power converter from a high voltage storage battery to a low voltage storage battery, specifically a DC-DC converter, is mounted on such a vehicle.

The DC-DC converter includes a high voltage side switching circuit for converting a DC high-voltage into an AC voltage, a transformer for converting an AC high-voltage into an AC low-voltage, and a low voltage side rectifier circuit for converting an AC low voltage into a DC voltage.

Generally, as a circuit configuration of a DC-DC converter, four MOSFETs are connected in an H bridge configuration as a high voltage side switching circuit, a smoothing capacitor is connected on an input side thereof, and a resonant chock coil is connected on an output line thereof. As a transformer, a center tap type transformer is used in which a middle point of a secondary side winding is pulled out to a winding outside. As a low voltage side rectifier circuit, a smoothing circuit including a chock coil and a capacitor is connected to a rectifier circuit using a diode or a MOSFET (refer to PTL 1 for example).

The above-described transformer includes a primary side winding (primary winding) connected to a high voltage side switching circuit, a secondary side winding (secondary winding) connected to a low voltage side rectifier circuit, and a magnetic body (core) for magnetically coupling the primary side and the secondary side and transmitting energy. Each winding is wound around a plastic bobbin for shape retaining and fixing support and attached to the core. Further, to enhance insulation of the primary winding and the secondary winding, an insulation tape and a spacer can be inserted between the primary winding and the secondary winding. As the winding, generally a copper wire such as an enamel wire is used. However, in a transformer using in a large output converter, the secondary winding is bonded on a copper plate such as a bus bar to increase a current capacity of the secondary side winding.

In the case where the above-described transformer is used in the large output converter, a temperature increase of the transformer becomes a problem. Since the primary winding and the secondary winding have a resistance component, a copper loss is caused by conduction, and heat is generated. When a DC-DC converter operates, an AC current corresponding to an operation frequency of the DC-DC converter flows in the primary winding and the secondary winding. Therefore, resistance components of the primary winding and the secondary winding increase by a skin effect in comparison with a DC resistance. Further, when the DC-DC converter operates, an AC magnetic flux is applied to a core of the transformer. Consequently, an iron loss is caused to the core, and heat is generated. As described above, since all of the primary winding, the secondary winding, and the core which are main components in the transformer are heated, the temperature increase becomes a problem.

To suppress the temperature increase in a transformer, the transformer is disposed via a grease and a heat conductive sheet on a case surface of a DC-DC converter including a cooling path or a radiation fin. Further, a resin material such as silicon rubber can be injected between windings and between a winding and a core to improve a heat radiation property. However, in a portion far from the case surface of the DC-DC converter, especially on an upper portion of the transformer, the transformer has a large heat resistance, and a temperature increase is not avoidable.

As a method for solving the temperature increase of a transformer, a two-transformer circuit configuration in which two transformers are used can be applied. When two transformers are used, a heat is generated dispersedly in the two transformers, and therefore, a temperature increase in each transformer is reduced. In the case where two transformers are used, usually, in each transformer, the primary winding is connected in series, and the secondary winding is connected in parallel (via a rectifier element) (refer to PTL 2 and 3 for example). By applying the above-described configuration, the number of turns required in the primary winding in each transformer is halved, and the height of a core of each transformer can be lowered by decreasing the number of winding turns. In the case where the height is lowered, a distance from an upper side of the core to a case surface is reduced, a heat resistance is lowered, and a heat radiation property is improved.

CITATION LIST

Patent Literature

PTL1: JP 2005-143215 A
PTL 2: JP 2009-142088 A
PTL 3: JP 2008-178205 A

SUMMARY OF INVENTION

Technical Problem

As described above, the two-transformer circuit configuration enables dispersing generated heat to each transformer and reducing a temperature increase in the transformers. However, in the case of using two transformers, a new wire is needed to connect between the transformers. Especially, since a large current flows on a secondary side, when a wire is increased, a wiring loss is also increased, and efficiency of a DC-DC converter is lowered. Further, a wiring structure becomes complicated, and component cost is also increased.

An object of the present invention is to suppress a temperature increase of a transformer.

Solution to Problem

A transformer and a power converter using the transformer according to the present invention includes a core, a primary winding, and a secondary winding. The core includes a primary core and a secondary core disposed on a side of the primary core. The primary winding includes a first primary winding wound around the primary core and the second primary winding wound around the secondary core and electrically connected in series to the first primary winding. The first primary winding is disposed such that a direction of magnetic flux on an inner peripheral side of the first primary winding induced by the first primary winding is opposite to a direction of the magnetic flux on the inner peripheral side of the second primary winding induced by the second primary winding. The secondary winding is wound such that a winding axial line of the first primary winding and a winding axial line of the second primary winding are formed on an inner peripheral side of the secondary winding.

Advantageous Effects of Invention

According to an embodiment of the present invention, a temperature increase of a transformer can be suppressed. Further, a highly efficient and low-profile power converter can be realized.

BRIEF DESCRIPTION OF DRAWINGS

FIG. 1A is an external perspective view of a transformer according to an embodiment described herein.

FIG. 2 is an exploded perspective view and an equivalent circuit diagram describing an operation principle of the transformer according to the embodiment.

FIG. 3 illustrates a power converter using a transformer according to a first embodiment, for example, a circuit configuration of a DC-DC converter.

FIG. FIG. 4A is an external perspective view of a mounting structure of the DC-DC converter using the transformer according to the first embodiment.

DESCRIPTION OF EMBODIMENTS

Hereinafter, embodiments of the present invention will be described with reference to drawings.

First Embodiment

Figure 1B:
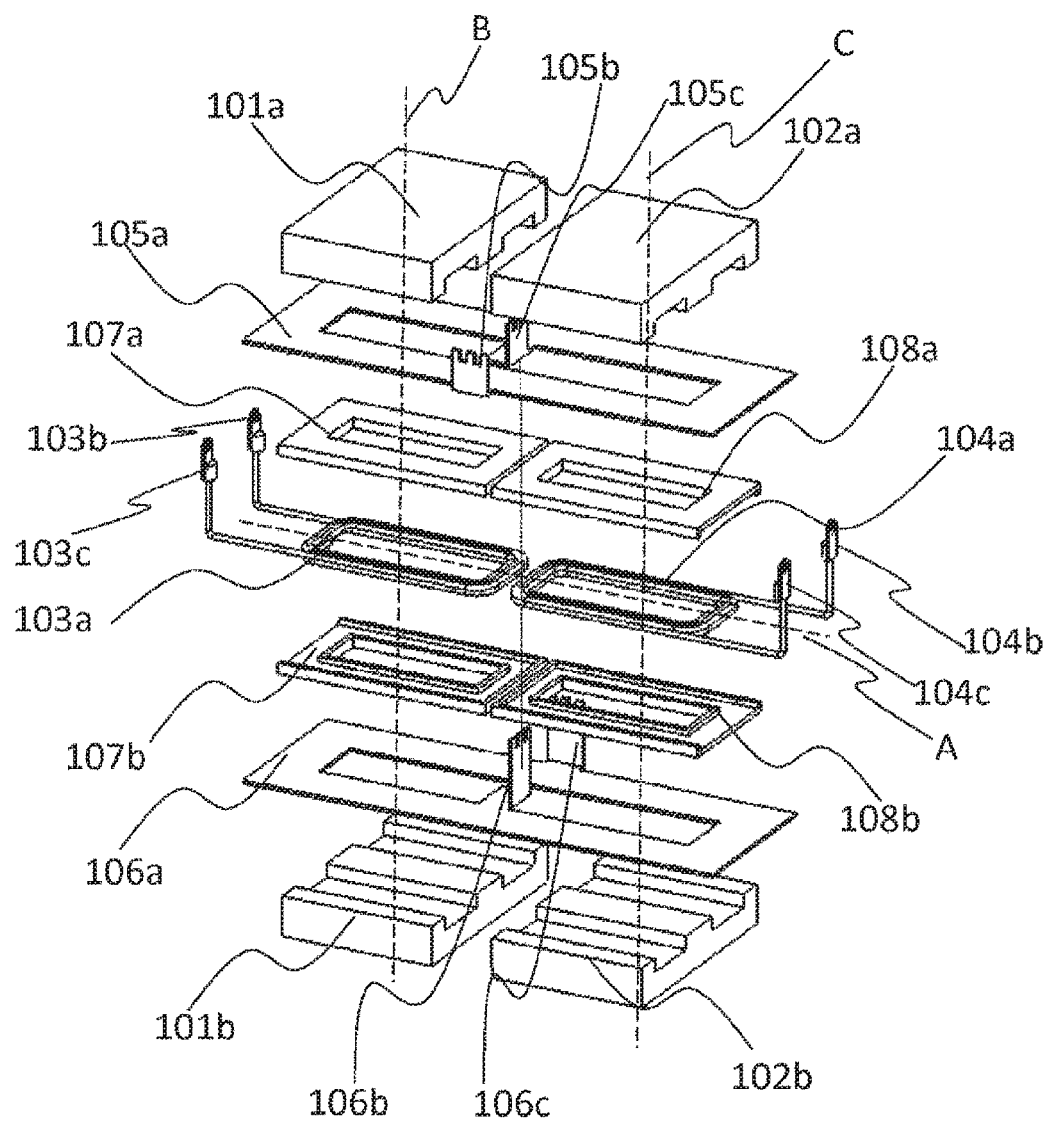
FIG. 1B is an exploded perspective view of the transformer according to the embodiment.
Figure 1C:
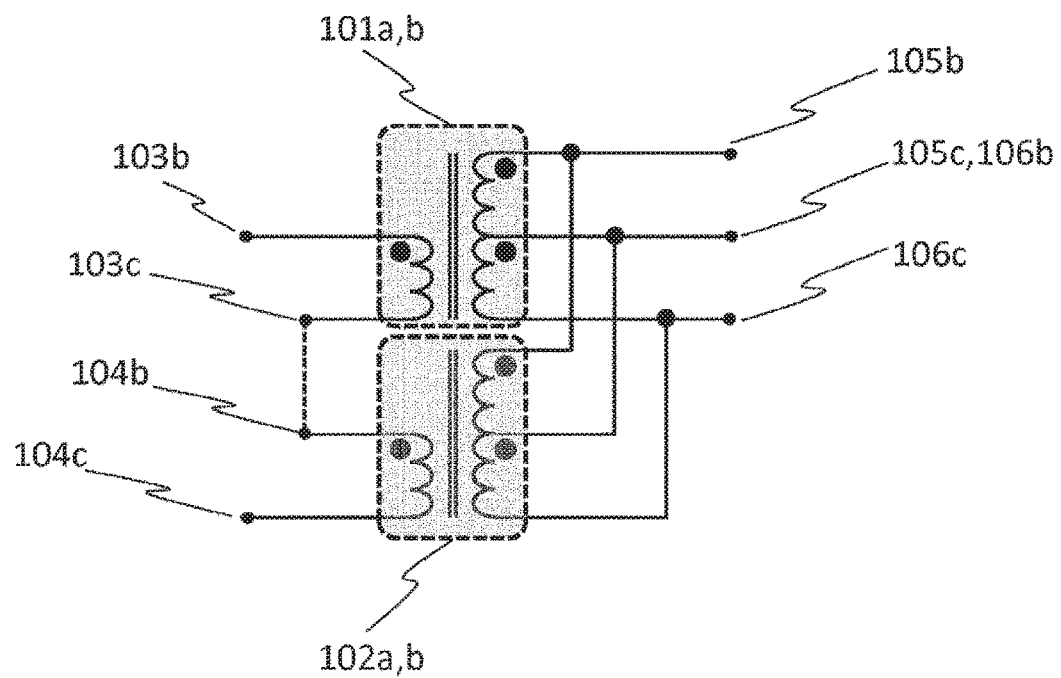
FIG. 1C is an equivalent circuit diagram of the transformer according to the embodiment.

FIG. 1(a) is an external perspective view of a transformer according to the present embodiment, FIG. 1(b) is an exploded view thereof, and FIG. 1(c) is an equivalent circuit diagram thereof.

A structure of the present embodiment will be described with reference to FIGS. 1(a) and 1(b). A primary winding 103a is wound around a primary core 101 including cores 101a and 101b formed in an E-type via bobbins 107a and 107b. Further, a primary winding 104a is wound around a secondary core 102 including cores 102a and 102b formed in the E-type via bobbins 108a and 108b.

By electrically connecting primary winding terminals 103c and 104b, primary winding units 103 and 104 are connected in series.

Bus bars 105 and 106 are disposed so as to sandwich the primary winding units 103 and 104 via bobbins 107a, 107b, 108a, and 108b. A bus bar plate 105a is formed so as to wind both of the primary core 101 and the secondary core 102 one turn. Similarly, a bus bar plate 106a is formed so as to wind both of the primary core 101 and the secondary core 102 one turn.

Bus bar terminal units 105c and 106b are connected by welding and soldering. Although a principle will be described later, a two-turn secondary winding unit commonly used in a primary transformer 1 and a secondary transformer 2 is formed by the bus bars 105 and 106. A current inlet/outlet to a rectifier circuit of the secondary winding unit is common in the primary transformer 1 and the secondary transformer 2, and the current inlet/outlet is three terminals including a bus bar terminal unit 105b, a bus bar terminal unit 105c (or a bus bar terminal unit 106b), and a bus bar terminal unit 106c. The bus bar terminal unit 105c (or the bus bar terminal unit 106b) is an intermediate terminal on a secondary side (a center tap terminal), and can be used without connecting to a rectifier circuit depending on a circuit configuration of a DC-DC converter.

Further, when defining a first line B in a direction vertical to an arrangement direction A of the primary windings 103 and 104 and overlapped with the primary winding 103 and a second line C in a direction vertical to the arrangement direction of the primary windings 103 and 104 and overlapped with the primary winding 104 are defined, the bus bar terminal units 105b, 105c (or 106b), and 106c are formed between the first line B and the second line C. Consequently, wire interference can be suppressed, and a transformer can be downsized.

FIG. 2 is an exploded perspective view and an equivalent circuit diagram describing an operation principle of the transformer according to the embodiment.

In the description drawing, the primary winding terminals 103c and 104b are electrically connected, and the primary winding units 103 and 104 are connected in series. Further, for simplification, the bus bar terminal unit 105c (or the bus bar terminal unit 106b) on the secondary side is not connected to a rectifier circuit.

In the case where a positive voltage is applied to a terminal 103b (a negative voltage is applied to a terminal 104c) in the primary winding units 103 and 104 connected in series, a current flows in the primary windings 103a and 104b in a direction indicated by arrows I1 in the drawing.

At this time, a direction of a magnetic flux φ1 generated in the primary core 101 is a downward direction as illustrated in the drawing. On the other hand, a direction of a magnetic flux φ2 generated in the secondary core 102 is an upward direction as illustrated in the drawing. In accordance with the Faraday's law, an electromotive force which generates a magnetic flux cancelling the magnetic fluxes φ1 and φ2 is generated in the secondary winding unit.

In the embodiment, in the bus bar 106 forming a secondary winding, an electromotive force is generated on the side in which the primary core 101 is wound such that a current I2 flows in the counterclockwise direction on a paper, and an electromotive force is generated on the side in which the secondary core 102 is wound such that the current I2 flows in the clockwise direction on a paper. Specifically, the current I2 flows into the bus bar 106 from the terminal 106c and flows on the primary core 101 side and the secondary core 102 side once. Then, the current joins again, and a voltage is generated such that the current flows out from the terminal 106b.

Similarly, the current I2 flows into the bus bar 105 from the terminal 105c and flows on the primary core 101 side and the secondary core 102 side once. Then, the current joins again, and a voltage is generated such that the current flows out from the terminal 105b. As described above, the terminals 106b and 105c are connected, and therefore the current I2 flows into the terminal 106c, divides on the primary core side and the secondary cores side, winds around the core two turns, and flows out from 105b. In other words, in this configuration, the secondary side winding units of the primary transformer 1 and the secondary transformer 2 are arranged in parallel, and in an equivalent circuit diagram, two transformers has a configuration as illustrated in FIG. 1(c), and the configuration is equalized with a circuit configuration in which the primary winding is connected in series, and the secondary winding is connected in parallel. Specifically, the secondary side windings of the primary transformer 1 and the secondary transformer 2 are wound such that a winding axial line of the primary winding unit 103 and a winding axial line of the primary winding unit 104 are formed on an inner peripheral side of the secondary side winding.

This configuration is a two-transformer circuit configuration, and generated heat is dispersed in the primary transformer 1 and the secondary transformer 2. Therefore, a temperature increase in the transformers can be reduced. Further, by connecting the primary winding series, a frequency of turns of the primary winding of each transformer can be halved. Accordingly, the height of the core can be lowered. Further, the primary transformer 1 and the secondary transformer 2 commonly use the secondary winding by using the bus bars 105 and 106. Therefore, as with a conventional two-transformer circuit configuration, new wire for connecting each transformer secondary side wiring is not needed. Therefore, a wiring loss can be reduced in comparison with the conventional two-transformer circuit configuration.

Second Embodiment

FIG. 3 illustrates a power converter using the transformer according to the first embodiment, for example, a circuit configuration of a DC-DG converter. An H bridge including MOSFETs 205a to 205d is connected on a primary side of a transformer 100. A resonant chock coil capable of zero voltage switching may be disposed between the transformer 100 and the H bridge, although it is not illustrated in the drawing. A smoothing capacitor 204 is connected on an input side of the H bridge. A rectifier circuit including MOSFETs 207a to 207f and a smoothing circuit including a chock coil 208 and a smoothing capacitor 210 are connected on a secondary side of the transformer 100. A noise filter circuit including a noise filter coil 209 and a noise filter capacitor 211 is connected on an output side of the smoothing circuit.

Figure 4B:
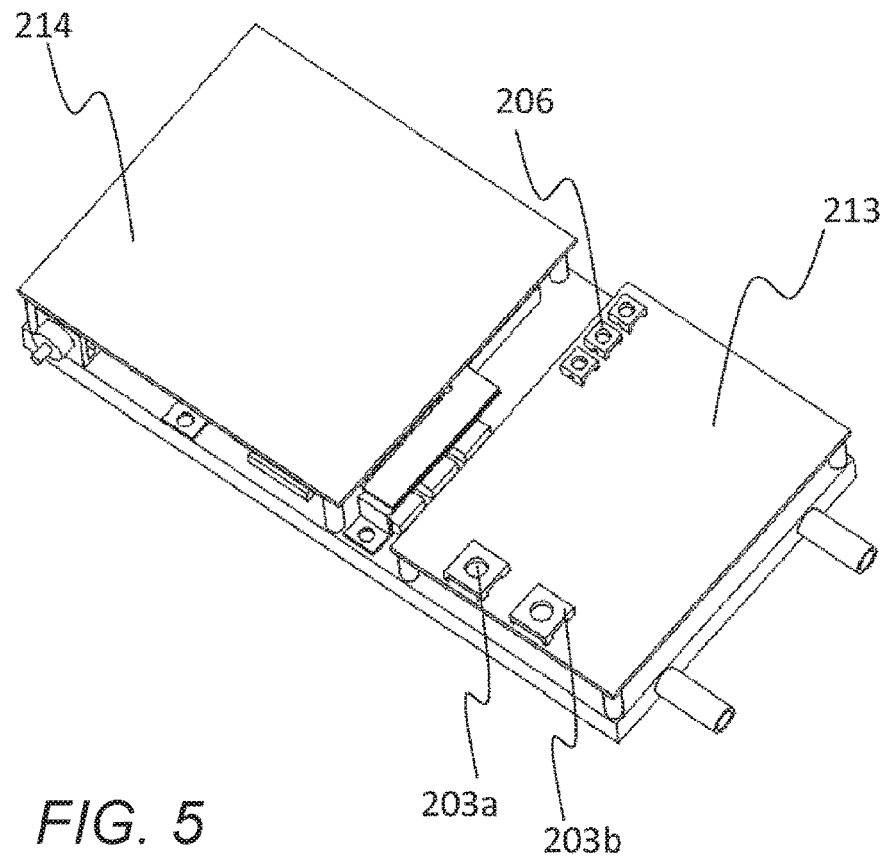
FIG. 4B is an external perspective view illustrating a mounting structure of a DC-DC converter mounting substrates 213 and 214.

FIG. 4(a) is an external perspective view of a mounting structure of a DC-DC converter using the transformer according to the first embodiment. FIG. 4(b) is an eternal perspective view illustrating a mounting structure of a DC-DC converter mounting substrates 213 and 214.

As illustrated in FIG. 4(a), main circuit components are disposed on a case 201 including a coolant channel including an inlet piping 202b and an output piping 202a. On an upper side of the main circuit components, the substrate 213 and 214 are mounted as illustrated in FIG. 4(b).

The transformer 100 is disposed at the substantial center of an upper surface of the case. A heat radiation property may be enhanced by applying a grease or sandwiching a radiation sheet between a core bottom surface of the transformer 100 and the upper surface of the case, although it is not illustrated in the drawing.

The MOSFETs 205a to 205d included in the H bridge and the smoothing capacitors 204a and 204b are disposed on the right side of the transformer 100, and the substrate 213 is disposed on upper portions of these. Each component is electrically connected by wiring of the substrate 213, and a high voltage switching circuit is formed.

Input terminal 203a and 203b are mounted on an upper surface of the substrate 213, and a high voltage input line can be connected. Further, a terminal 206 is provided on an upper surface of the substrate 213 to connect a primary side winding of the transformer 100. The MOSFETs 205a to 205d (not illustrated in the drawing) are disposed on a case upper surface via a radiation sheet and a ceramic substrate for radiation and insulation. Further, a gate driver circuit for driving the MOSFETs 205a to 205d and a detection circuit for monitoring a primary side current can be mounted to the substrate 213.

The MOSFETs 207a to 207f including a rectifier circuit are disposed very close to the transformer 100. Specifically, a plurality of the MOSFETs 207a to 207f electrically connected in parallel is disposed along an arrangement direction of the primary windings 103 and 104 (refer to FIG. 2) of the transformer 100.

The transformer 100 and a drain terminal of each MOSFET are connected by bus bars 302 and 303. Further, a source terminal of the MOSFET is grounded to the case 201 by bus bars 304 and 305. Each of the MOSFETs (not illustrated in the drawing) is disposed on the case upper surface via a radiation sheet and a ceramic substrate for radiation and insulation.

The chock coil 208, the smoothing capacitor 210, the noise filter coil 209, the noise filter capacitor 211, and an output terminal 212 are disposed on the left side of the transformer 100, and the transformer 100 and the chock coil 208 are connected by a bus bar 301.

A control circuit of a DC-DC converter including a gate driver, a microcomputer, and a DSP for driving the MOSFETs 207a to 207f is mounted on the substrate 214.

The transformer 100 according to the embodiment has s low profile, and therefore can be disposed on the case upper surface by equalizing the height with other main circuit components such as a MOSFET and a capacitor. Therefore, an unnecessary space is not provided between the case and the substrates 213 and 214, and the whole of a DC-DC converter can be mounted in high density. Further, since a rectifier circuit in which a large current flows is disposed very close to the transformer 100, wiring loss can be reduced, and a highly efficient DC-DC converter can be realized.

Third Embodiment

Figure 5:
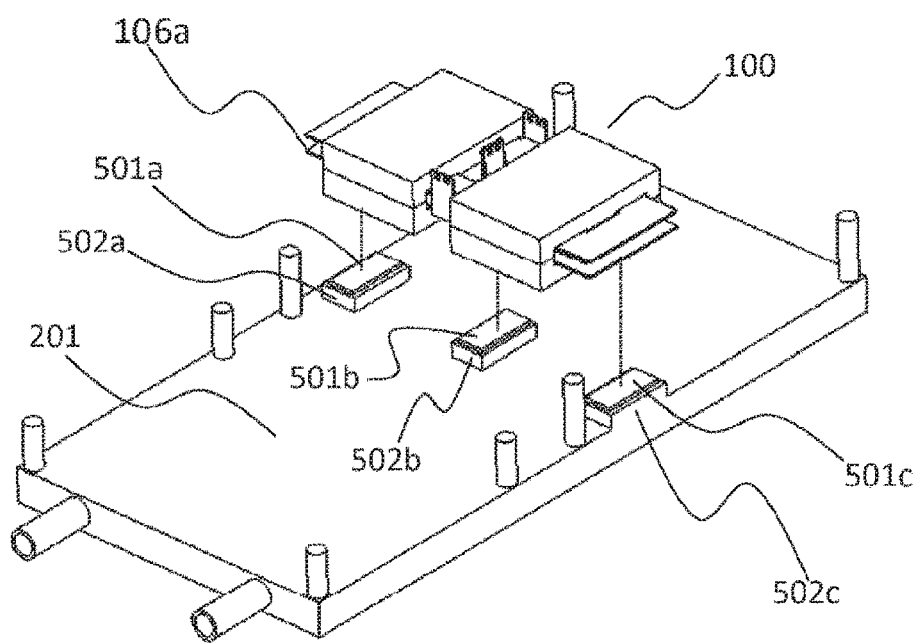
FIG. 5 is an external perspective view illustrating a cooling structure of a transformer 100 according to other embodiments.

FIG. 5 is an external perspective view illustrating a cooling structure of a transformer 100. On an upper surface of a case 201, projecting portions 502a, 502b, and 503c are provided, and radiation sheets 501a, 501b, and 501c are bonded.

The transformer 100 is disposed such that the above-described radiation sheets 501a to 501c come into contact with a bus bar plate 106a of a secondary winding. By applying this configuration, a temperature increase of the bus bar plate 106a of the secondary winding can be suppressed.

Further, by injecting resin such as silicon in a space between a bobbin and a primary winding or sandwiching a radiation sheet between the bobbin and a bus bar forming the secondary winding, a heat radiation property of the winding can be further improved.

Fourth Embodiment

Figure 6:
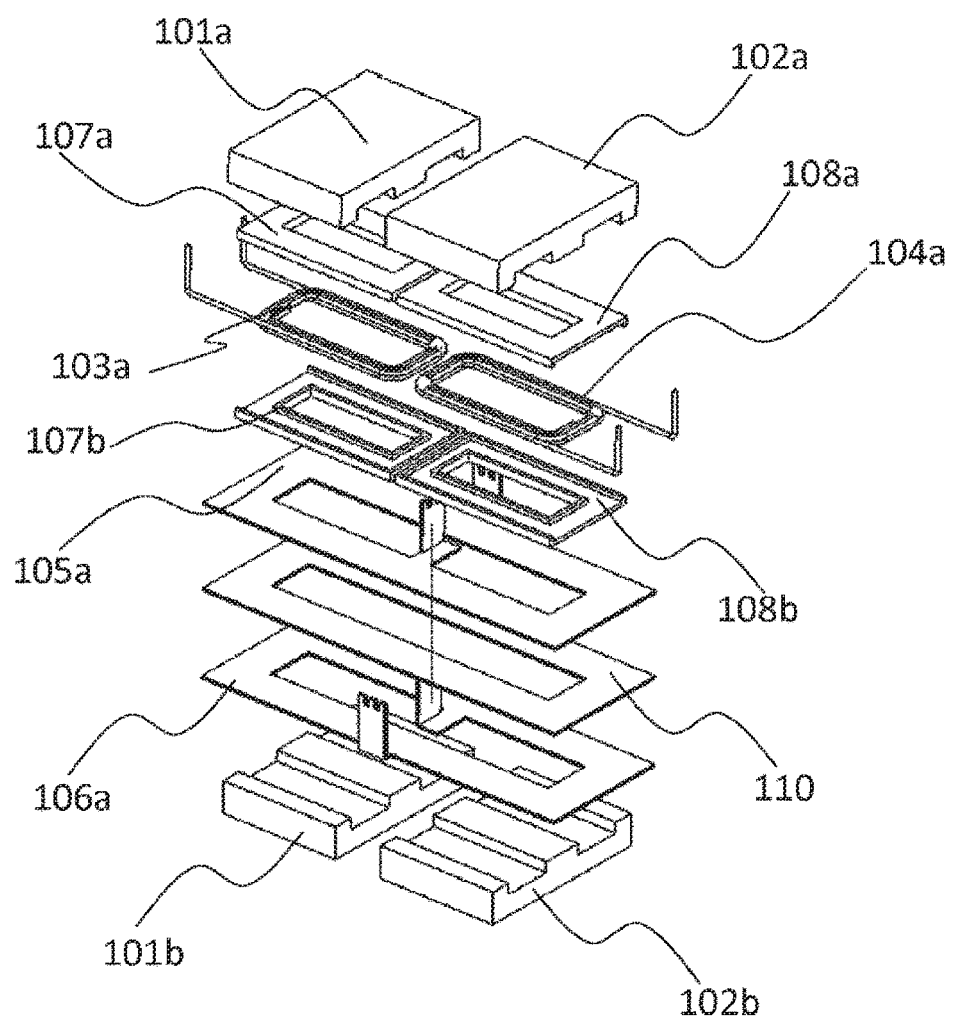
FIG. 6 is an exploded perspective view of the transformer according to other embodiments.

FIG. 6 is an exploded perspective view of the transformer according to other embodiments. In the present embodiment, a lamination structure of a winding is different in comparison with that in the first embodiment.

As compared with FIG. 1(b), a bus bar plate 105a forming a secondary winding is disposed on an upper side of bobbins 107a and 108a in FIG. 1(b). However, in the embodiment, the bus bar plate 105a is disposed on a lower side of the bobbins 107b and 108b, and further an insulating plate 110 is newly provided between the bus bar plates 105a and 106a. The insulating plate 110 may be a radiation sheet for improving a heat radiation property.

In the case where, for example, a power converter including a cooling structure described in the third embodiment is used in the above-described transformer configuration, in comparison with the transformer configuration according to the first embodiment, a heat radiation property of the bus bar plate 105a forming the secondary winding can be improved. Therefore, this configuration is effective in the case where heat generated in the secondary winding is substantially increased.

Fifth Embodiment

Figure 7:
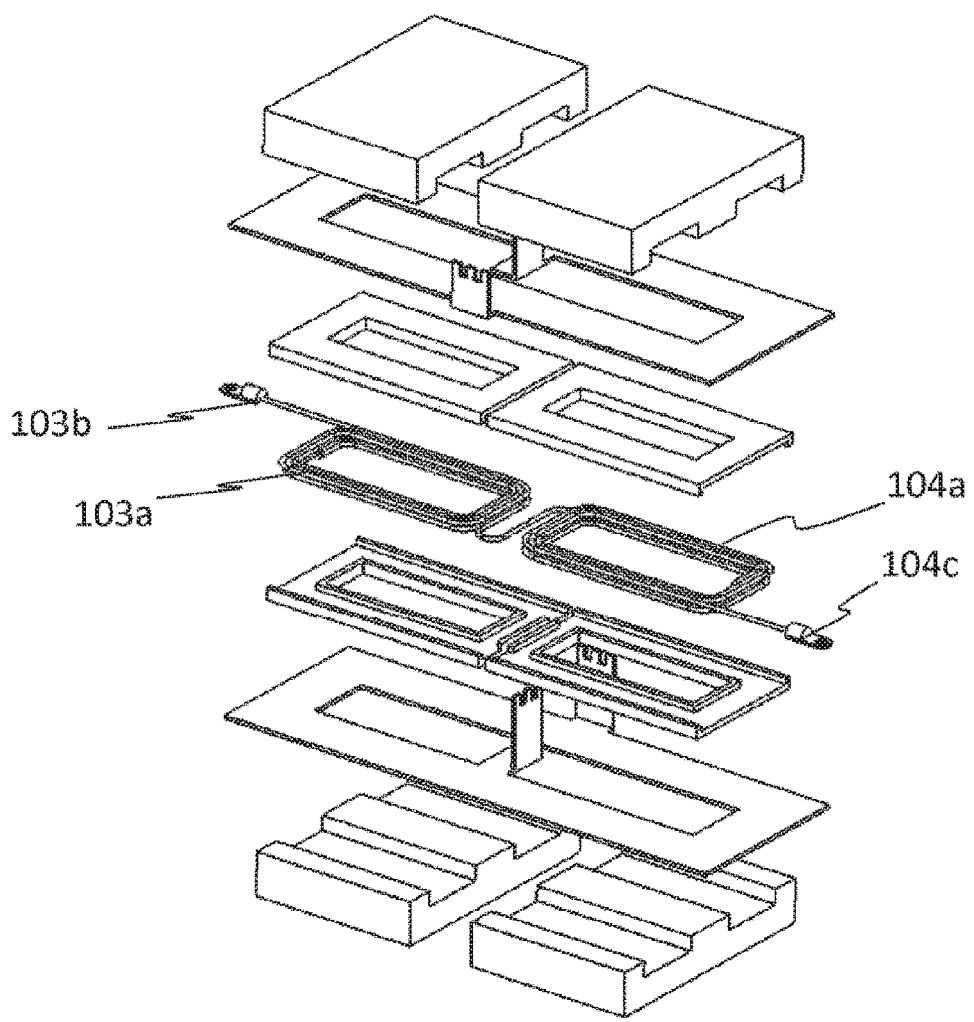
FIG. 7 is an exploded perspective view of the transformer according to other embodiments.

FIG. 7 is an exploded perspective view of a transformer according to other embodiments. In the present embodiment, a configuration of a primary winding is different in comparison with that in the first embodiment. Specifically, the primary windings 103a and 104a are separately formed of a copper line in the first embodiment as illustrated in FIG. 1(b). However, in the present embodiment, the primary windings 103a and 104a are integrally formed by a copper line.

In the first embodiment, as illustrated in FIG. 1(b), the primary windings 103a and 104a are separately formed by a copper line, and it is assumed that terminal units 103c and 104b are electrically connected when these windings are connected in series. It can be easily realized, for example, by which the terminal units 103c and 104b are fastened together by a screw on a terminal stand 206 illustrated in FIG. 4(b).

However, if the primary windings 103a and 104a are integrally formed as in the embodiment, the number of terminal units and terminal stands can be reduced.

REFERENCE SIGNS LIST 1 primary transformer
2 secondary transformer
100 transformer
101 primary core
101a, b F-type core
102 secondary core
102a, b F-type core
103 primary winding unit
103a winding
103b, c terminal
104 primary winding unit
104a winding
104b, c terminal
105 bus bar
105a bus bar plate
105b, c terminal unit
106 bus bar
106a bus bar plate
106b, c terminal unit
107a, b bobbin
108a, b bobbin
110 insulating plate
201 case
202a, b coolant channel inlet
203a, b high voltage input terminal
204 smoothing capacitor
204a, b smoothing capacitor
205a, b, c, d MOSFET
206 primary winding terminal stand
207a, b, c, d, e, f MOSFET
208 chock coil
209 noise filter coil
210 smoothing capacitor
211 noise filter capacitor
212 output terminal
213, 214 substrate
301, 302, 303, 304, 305 bus bar
501a, b, c radiation sheet
502a, b, c projecting portion

The invention claimed is:

1. A transformer comprising;
a core;
a primary winding; and
a secondary winding,
wherein the core comprises a primary core and a secondary core disposed on a side of the primary core,
the primary winding comprises a first primary winding wound around the primary core and a second primary winding wound around the secondary core and electrically connected in series to the first primary winding,
the first primary winding is disposed such that a direction of a magnetic flux on an inner peripheral side of the first primary winding induced by the first primary winding is opposite to a direction of the magnetic flux on an inner peripheral side of the second primary winding induced by the second primary winding, and
the secondary winding is wound so as to form a parallel circuit by forming a winding axial line of the first primary winding and a winding axial line of the second primary winding on an inner peripheral side of the secondary winding, and
the secondary winding includes a plurality of terminals that project upward from the secondary winding between the primary core and the secondary core, the plurality of terminals including a first pair of terminals arranged in parallel to each other in a center of a width of the secondary winding and a second pair of terminals arranged in parallel to each other at opposite ends of the width of the secondary winding.

2. The transformer according to claim 1, wherein the first primary winding is disposed such that a winding axial direction of the first primary winding is parallel to a winding axial direction of the second primary winding.

3. The transformer according to claim 1, wherein the terminal is configured to input and output a current to and from the secondary winding, and the terminal is formed between a first line and a second line when the first line in a direction vertical to an arrangement direction of the first primary winding and the second primary winding and overlapped with the first primary winding, and the second line in a direction vertical to an arrangement direction of the first primary winding and the second primary winding and overlapped with the second primary winding are defined.

4. The transformer according to claim 1, wherein a radiation sheet is disposed between the core and the secondary winding.

5. A power converter, wherein the transformer according to claim 1 is mounted in a case.

6. The power converter according to claim 5, wherein a plurality of rectifier elements on a transformer secondary side is electrically connected in parallel, and the plurality of rectifier elements electrically connected in parallel are disposed along an arrangement direction of the first primary winding and the second primary winding of the transformer.

7. The transformer according to claim 1, wherein the first pair of terminals is perpendicular to the second pair of terminals.

8. A transformer comprising:
a core;
a primary winding; and
a secondary winding,
wherein the core comprises a primary core and a secondary core disposed on a side of the primary core,
the primary winding comprises a first primary winding wound around the primary core and a second primary winding wound around the secondary core and electrically connected in series to the first primary winding,
the first primary winding is disposed such that a direction of a magnetic flux on an inner peripheral side of the first primary winding induced by the first primary winding is opposite to a direction of the magnetic flux on an inner peripheral side of the second primary winding induced by the second primary winding, and
the secondary winding is wound so as to form a parallel circuit by forming a winding axial line of the first primary winding and a winding axial line of the second primary winding on an inner peripheral side of the secondary winding,
wherein the secondary winding comprises a first secondary winding and a second secondary winding,
the first secondary winding comprises a first terminal and a second terminal that are perpendicular to each other,
the second secondary winding comprises a third terminal and a fourth terminal that are perpendicular to each other,
the second terminal is electrically connected to the third terminal,
the second terminal and the third terminal are formed on an inner peripheral side of the secondary winding, and
the first terminal and the fourth terminal are formed on an outer peripheral side of the secondary winding.

9. The transformer according to claim 8, wherein the first terminal and the fourth terminal are parallel to each other and the second terminal and the third terminal are parallel to each other.

* * * * *